US011532165B2

(12) United States Patent
Slutsky et al.

(10) Patent No.: US 11,532,165 B2
(45) Date of Patent: Dec. 20, 2022

(54) NATURAL SURROUND VIEW

(71) Applicant: GM GLOBAL TECHNOLOGY OPERATIONS LLC, Detroit, MI (US)

(72) Inventors: Michael Slutsky, Kfar Saba (IL); Daniel Kigli, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 445 days.

(21) Appl. No.: 16/801,587

(22) Filed: Feb. 26, 2020

(65) Prior Publication Data
US 2021/0264166 A1 Aug. 26, 2021

(51) Int. Cl.
*G06K 9/00* (2022.01)
*G06V 20/56* (2022.01)
*G06N 3/08* (2006.01)
*G06T 7/536* (2017.01)
*G06V 10/75* (2022.01)

(52) U.S. Cl.
CPC ............. *G06V 20/56* (2022.01); *G06N 3/08* (2013.01); *G06T 7/536* (2017.01); *G06V 10/751* (2022.01)

(58) Field of Classification Search
CPC ...... G06V 20/56; G06V 10/751; G06T 7/536; G06N 3/08
See application file for complete search history.

(56) References Cited

U.S. PATENT DOCUMENTS

| | | | | |
|---|---|---|---|---|
| 2015/0228079 | A1* | 8/2015 | Murarka | G06T 7/593 345/419 |
| 2017/0158235 | A1* | 6/2017 | Goncalves | B60R 1/00 |
| 2017/0262768 | A1* | 9/2017 | Nowozin | G06K 9/6256 |
| 2019/0349571 | A1* | 11/2019 | Herman | H04N 5/247 |
| 2022/0132049 | A1* | 4/2022 | Tamura | H04N 5/2628 |

OTHER PUBLICATIONS

Chen, Cheryl "DeepDriving: Learning Affordance for Direct Perception in Autonomous Driving", Proceedings of the IEEE International Conference on Computer Vision (ICCV), 2015, pp. 2722-2730 (Year: 2015).*
C. Chen, A. Seff, A. Kornhauserand J. Xiao, "DeepDriving: Learning Affordance for Direct Perception in Autonomous Driving," 2015 IEEE International Conference on Computer Vision (ICCV), 2015, pp. 2722-2730, doi: 10.1109/ICCV.2015.312.

* cited by examiner

*Primary Examiner* — Terrell M Robinson
(74) *Attorney, Agent, or Firm* — Lorenz & Kopf, LLP

(57) ABSTRACT

In various embodiments, methods and systems are provided for processing camera data from a camera system associated with a vehicle. In one embodiment, a method includes: storing a plurality of photorealistic scenes of an environment; training, by a processor, a machine learning model to produce a surround view approximating a ground truth surround view using the plurality of photorealistic scenes as training data; and processing, by a processor, the camera data from the camera system associated with the vehicle based on the trained machine learning model to produce a surround view of an environment of the vehicle.

18 Claims, 4 Drawing Sheets

NATURAL SURROUND VIEW

TECHNICAL FIELD

The technical field generally relates to systems and methods for processing camera data from a camera system, more specifically, to methods and systems for training machine learning models to process camera data to produce natural, artifact-free surround views.

Vehicles incorporate camera systems to capture scenes from the vehicle surround. The camera systems include one or more cameras mounted to an exterior of the vehicle. In some cases, the image data representing the captured scene and generated by the cameras is synthesized in order to generate a surround view. The generated surround views include artifacts (i.e., distortions, scale inconsistencies, ghosting and/or fully or partially eliminated objects) that may be undesirable in a surround view.

Accordingly, it is desirable to provide improved methods and systems for processing camera data from a camera system to provide surround views that reduce or eliminate the appearance of artifacts. Furthermore, other desirable features and characteristics of the present invention will become apparent from the subsequent detailed description of the invention and the appended claims, taken in conjunction with the accompanying drawings and this background of the invention.

SUMMARY

In various embodiments, methods and systems are provided for processing camera data from a camera system associated with a vehicle. In one embodiment, a method includes: storing a plurality of photorealistic scenes of an environment; training, by a processor, a machine learning model to produce a surround view approximating a ground truth surround view using the plurality of photorealistic scenes as training data; and processing, by a processor, the camera data from the camera system associated with the vehicle based on the trained machine learning model to produce a surround view of an environment of the vehicle.

In various embodiments, the training is based on deep learning methods. In various embodiments, the machine learning model includes a deep neural network. In various embodiments, the plurality of scenes is generated based on one or more style transfer methods. In various embodiments, the plurality of scenes is generated based on physical models. In various embodiments, the plurality of scenes is generated based on graphic design.

In various embodiments, the training includes: projecting the scenes onto cameras using camera parameters to simulate an input view; and processing the input view with the machine learning model to generate a virtual surround view approximating one that would be obtained if acquired from a given vantage point by a camera with desired viewpoint parameters.

In various embodiments, the processing the camera data includes: determining first depth values based on a single camera model for each camera input; determining pairwise disparity maps from overlapping sections of two adjacent camera images from the camera data; and determining a surround depth map based on the first depth values and the pairwise disparity map.

In various embodiments, the processing the camera data further includes determining viewpoint disparities between pixels on a desired viewpoint surround view and a camera pixels; and generating the surround view based on the viewpoint disparities.

In various embodiments, the processing the camera data further includes identifying occlusions based on the depth map; performing handling of the identified occlusions; and generating the surround view based on the handled occlusions.

In another embodiment, a non-transitory computer readable medium for processing camera data from a camera system associated with a vehicle is provided. The non-transitory computer readable medium includes: a data storage device configured to store a plurality of photorealistic scenes of an environment; a training module configured to, by a processor, train a machine learning model to produce a surround view approximating a ground truth surround view using the plurality of photorealistic scenes as training data; and a data processing module configure to, by a processor, process the camera data from the camera system associated with the vehicle based on the trained machine learning model to produce a surround view of the environment of the vehicle.

In various embodiments, the training module performs the training based on deep learning methods. In various embodiments, the machine learning model includes a deep neural network. In various embodiments, the plurality of scenes is generated based on one or more style transfer methods. In various embodiments, the plurality of scenes is generated based on physical models. In various embodiments, the plurality of scenes is generated based on graphic design.

In various embodiments, training module trains by: projecting the scenes onto cameras using camera parameters to simulate an input view; and processing the input view with the machine learning model to generate a virtual surround view approximating one that would be obtained if acquired from a given vantage point by a camera with desired viewpoint parameters.

In various embodiments, data processing module processes the camera data by: determining first depth values based on a single camera model for each camera input; determining pairwise disparity maps from overlapping sections of two adjacent camera images from the camera data; and determining a surround depth map based on the first depth values and the pairwise disparity map.

In various embodiments, data processing module processes the camera data by determining viewpoint disparities between pixels on a desired viewpoint surround view and input camera pixels; and generating the surround view based on the viewpoint disparities.

In various embodiments, data processing module processes the camera data by identifying occlusions based on the depth map; performing handling of the identified occlusions; and generating the surround view based on the handled occlusions.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
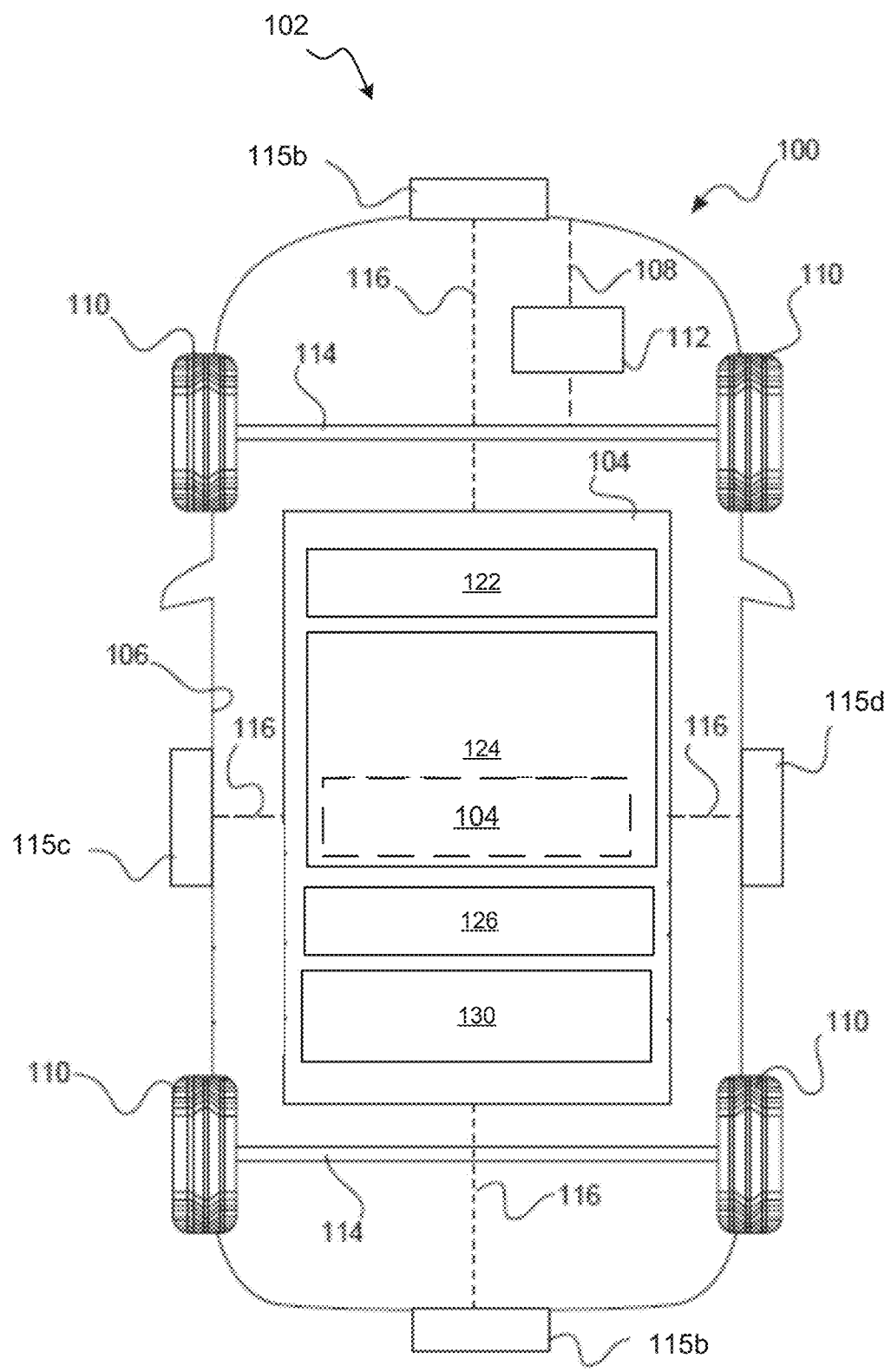
FIG. 1 is a functional block diagram of a vehicle that includes a camera system and is associated with a camera data processing system, in accordance with various embodiments.

FIG. 1 illustrates a vehicle 100, according to an exemplary embodiment. As described in greater detail further below, the vehicle 100 includes a camera system 102 having one or more cameras 115 and a camera data processing system 104. In certain embodiments, the cameras 115 capture scenes of the environment of the vehicle 100 and provide data to the camera data processing system 104. The camera data processing system 104 processes the camera data using trained machine learning models to synthesize the data from the multiple cameras 115 into a surround view. In various embodiments, the surround view is presented in a top-down view, panoramic view, or other views. As will be discussed in more detail below, the camera data processing system 104 trains the machine learning models to produce a ground truth surround view based on a database of photo-realistic scenes.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems, for example having a camera system 102.

The vehicle 100 includes a body 106 that is arranged on a chassis 108. The body 106 substantially encloses other components of the vehicle 100. The body 106 and the chassis 108 may jointly form a frame. The vehicle 100 also includes a plurality of wheels 110. The wheels 110 are each rotationally coupled to the chassis 108 near a respective corner of the body 106 to facilitate movement of the vehicle 100. In one embodiment, the vehicle 100 includes four wheels 110, although this may vary in other embodiments (for example for trucks and certain other vehicles).

A drive system 112 is mounted on the chassis 108, and drives the wheels 110, for example via axles 114. The drive system 112 preferably comprises a propulsion system. In certain exemplary embodiments, the drive system 112 comprises an internal combustion engine and/or an electric motor/generator, coupled with a transmission thereof. In certain embodiments, the drive system 112 may vary, and/or two or more drive systems 112 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in certain embodiments, the camera system 102 includes a rear vision camera 115a that is mounted on a rear portion of the vehicle 100, a front vision camera 115b that is mounted on a front portion of the vehicle 100, a driver side camera 115c that is mounted on a driver side of the vehicle 100, and a passenger side camera 115d that is mounted on a passenger side of the vehicle 100. In various embodiments, the cameras 115 capture images of the vehicle 100 and/or the surrounding environment of the vehicle 100, for example in detecting other vehicles, other objects, a roadway, roadway features, and the like from various sides of the vehicle 100 (e.g., front side, rear side, passenger side, and driver side), for example to assist the vehicle 100 and/or driver in travelling along a roadway (e.g., to avoid contact with other vehicles and/or other objects). In various embodiments, one or more of the cameras 115 may also be disposed on one or more other locations of the vehicle 100, for example on top of the vehicle 100 or inside of the vehicle 100, for example to create a surround view and/or one or more other views for the vehicle 100. In various embodiments, the number, locations, and/or placement of the cameras 115 may vary (e.g., in certain embodiments, a single camera may be used, and so on).

In various embodiments, a control system 118 controls operation of components of the vehicle 100. In various embodiments, the control system 118 controls operation of the camera system 102. In various embodiments, the control system 118 includes all or part of the camera data processing system 104. In various embodiments, the control system 118 is disposed within the body 106 of the vehicle 100. In certain embodiments, the control system 118 and/or one or more components thereof including the camera data processing system 104 may be disposed outside of the body 106, for example on a partially or fully on a remote server, in the cloud, or in a remote smart phone or other device where image processing can be performed remotely. In addition, in various embodiments, the control system 118 may be disposed within and/or as part of the cameras 102 and/or within and/or or as part of one or more other vehicle systems (not shown).

Also, as depicted in FIG. 1, in various embodiments the control system 118 is coupled to the camera system 102 via one or more communications links 116 and receives camera image data from the cameras 115 via the communications links 116. In certain embodiments, each communications link 116 comprises one or more wired connections, such as one or more cables (e.g. coaxial cables and/or one or more other types of cables). In other embodiments, each communications link 116 may comprise one or more wireless connections, e.g., using one or more transceivers.

In various embodiments, the control system 118 comprises a computer system. For example, the control system 118 includes a processor 122, a memory 124, an interface 126, and a bus 130. The processor 122 performs the computation and control functions of the computer system and may comprise any type of processor or multiple processors, single integrated circuits such as a microprocessor, or any suitable number of integrated circuit devices and/or circuit boards working in cooperation to accomplish the functions of a processing unit. During operation, the processor 122 executes one or more programs 132 stored within the memory 124 and, as such, controls the general operation of the computer system. In various embodiments, the processor executes programs described with regard to the systems and processes described further below in connection with FIG. 2-5.

The memory 124 can be any type of suitable memory. For example, the memory 124 may include various types of dynamic random-access memory (DRAM) such as SDRAM, the various types of static RAM (SRAM), and the various types of non-volatile memory (PROM, EPROM, and flash). In certain examples, the memory 124 is located on and/or co-located on a same computer chip as the processor 122. In the depicted embodiment, the memory 124 stores the above-referenced programs along with one or more stored values 134 (e.g., including, in various embodiments, previous calibrations, default calibrations, etc.).

The interface 126 allows communication to the computer system, for example from a system driver and/or another computer system and can be implemented using any suitable method and apparatus. In one embodiment, the interface 126 obtains the various data from the cameras 115. The interface 126 can include one or more network interfaces to communicate with other systems or components. The interface 126 may also include one or more network interfaces to communicate with technicians, and/or one or more storage interfaces to connect to storage apparatuses.

The bus 130 serves to transmit programs, data, status and other information or signals between the various components of the computer system. The bus 130 can be any suitable physical or logical means of connecting computer systems and components. This includes, but is not limited to, direct hard-wired connections, fiber optics, infrared and wireless bus technologies.

It will be appreciated that while this exemplary embodiment is described in the context of a fully functioning computer system, those skilled in the art will recognize that the mechanisms of the present disclosure are capable of being distributed as a program product with one or more types of non-transitory computer-readable media used to store the program and the instructions thereof and carry out the distribution thereof, such as a non-transitory computer readable medium bearing the program and containing computer instructions stored therein for causing a computer processor (such as the processor 122) to perform and execute the program. It will similarly be appreciated that the computer system may also otherwise differ from the embodiment depicted in FIG. 1.

Figure 2:
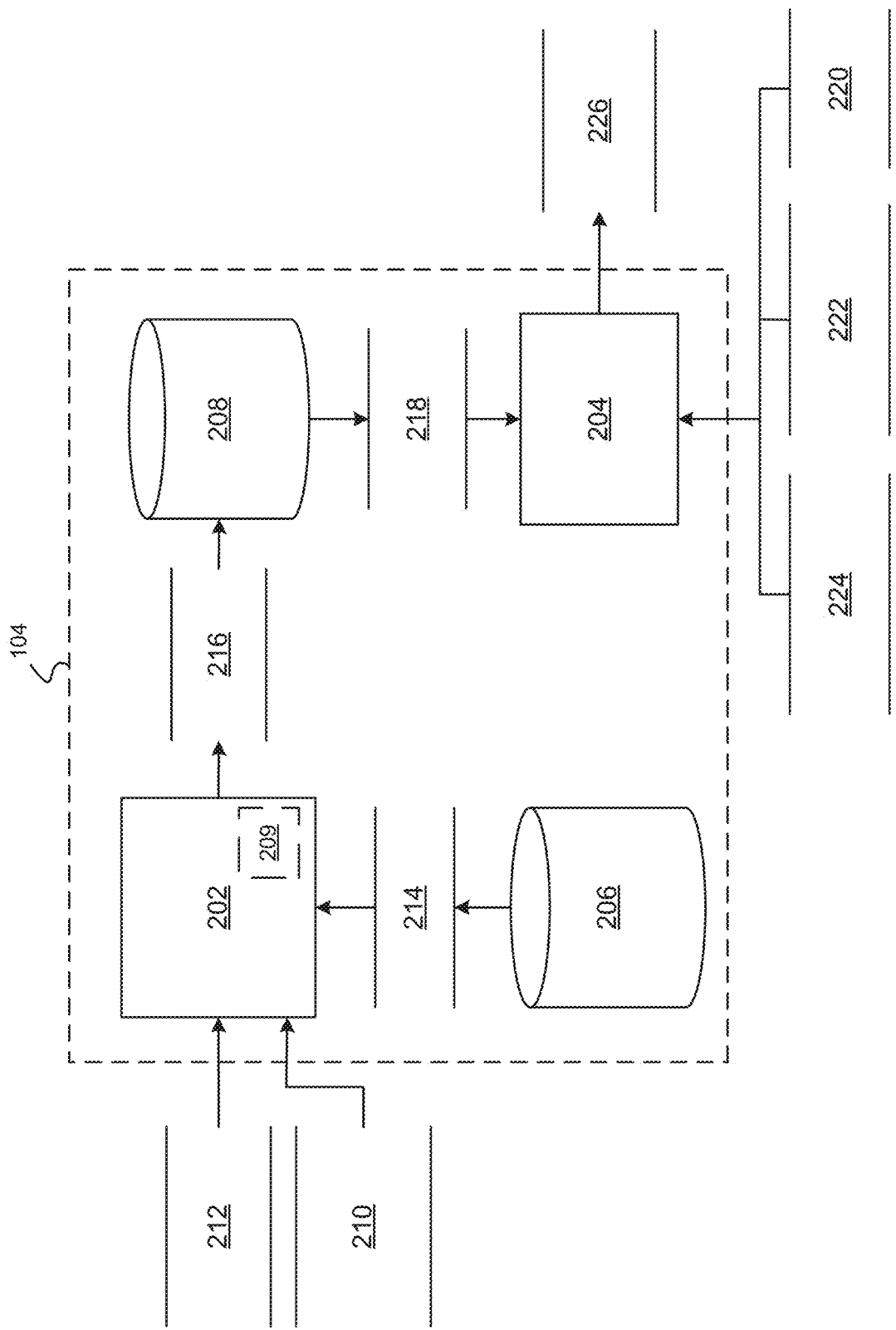
FIG. 2 is a dataflow diagram illustrating the camera data processing system of FIG. 1, in accordance with various embodiments.

With reference now to FIG. 2 and with continued reference to FIG. 1, a dataflow diagram illustrates the camera data processing system 104 of FIG. 1 being configured to train machine learning models and process camera data using the trained machine learning models in accordance with exemplary embodiments. As depicted in FIG. 2, in various embodiments, the camera data processing system 104 can include one or more modules, or sub-modules. As can be appreciated, the modules and sub-modules shown may be combined and/or further partitioned to train machine learning models and process camera data using the trained machine learning models in various embodiments. In various embodiments, the camera data processing system 104 includes a training module 202, a data processing module 204, a scene datastore 206, and a model datastore 208.

The training module 202 trains a machine learning model 209 based on scenes stored in the scene datastore 206. The scenes 214 stored in the scene datastore 206 include scenes of the environment. In various embodiments, the scenes are actual scenes captured by surround cameras, and depth values captured by depth sensors (not shown). In various other embodiments, the scenes 214 are photorealistic scenes or scenes that are not actual images of the environment rather, are machine generated images to mimic an environment. The photorealistic scenes include three-dimensional depth information of the scene, that allows for re-projection of any scene to any accessible viewpoint. Many photorealistic scenes 214 can be generated by methods such as, but not limited to, graphic design, physical models, style transfer methods, etc. and stored in the scene datastore 206. For example, in various embodiments, an actual scene can be obtained by a camera in the environment and various style transfer methods can be applied to the actual scene to achieve various photorealistic scenes of the environment. The style transfer methods can emulate various sensor types, views, and orientations.

As will be discussed in more detail below, the machine learning model 209 generates surround views of the environment from a chosen vantage point given inputs of camera images, parameters indicating the camera poses and alignments, and parameters indicating the desired viewpoint and alignment.

In various embodiments, the training module 202 trains the machine learning model 209 to eventually process camera images by using the photorealistic scenes 214 and deep learning techniques. For example, the training module 202 receives scenes 214 from the scene datastore 206, camera parameters 212 of cameras associated with the scenes 214 (e.g., calibrations and alignments of a camera associated with the scene 214), and desired viewpoint parameters 210 (e.g., calibrations and alignments of a camera at a desired viewpoint). Generally speaking, the machine learning model 209, as it is trained, projects the scenes 214 onto cameras using the camera parameters 212 thereby simulating the input surround imagery. The simulated surround imagery is then passed through the machine learning model to generate an image approximating one that would be obtained if acquired from a given vantage point by a camera with desired viewpoint parameters 210. In various embodiments, the training module 202 feeds numerous input images through the machine learning model 209, all the time varying the model parameters (e.g., by back-propagation) to generate output views that should approximate corresponding ground truth (GT) outputs as close as possible. In the beginning, the output image includes a random collection of pixels and has nothing to do with the ground truth; as the training proceeds, the collection of pixels starts resembling the ground truth more and more. These approximated views are then compared against known information from the photorealistic scenes 214 to update the machine learning model 209. Once trained, the machine learning model 209 is stored as model data 216 in the model datastore 208 for future use.

The data processing module 202 retrieves the trained machine learning model 209 from the model datastore as model data 218 and processes camera data 220 from the camera system 102 of the vehicle 100 to produce a synthesized surround view 226 of the actual environment. The synthesized surround view 226 may then be displayed to a user on a display or used by other systems of the vehicle 100 to control operation of the vehicle 100.

Figure 3:
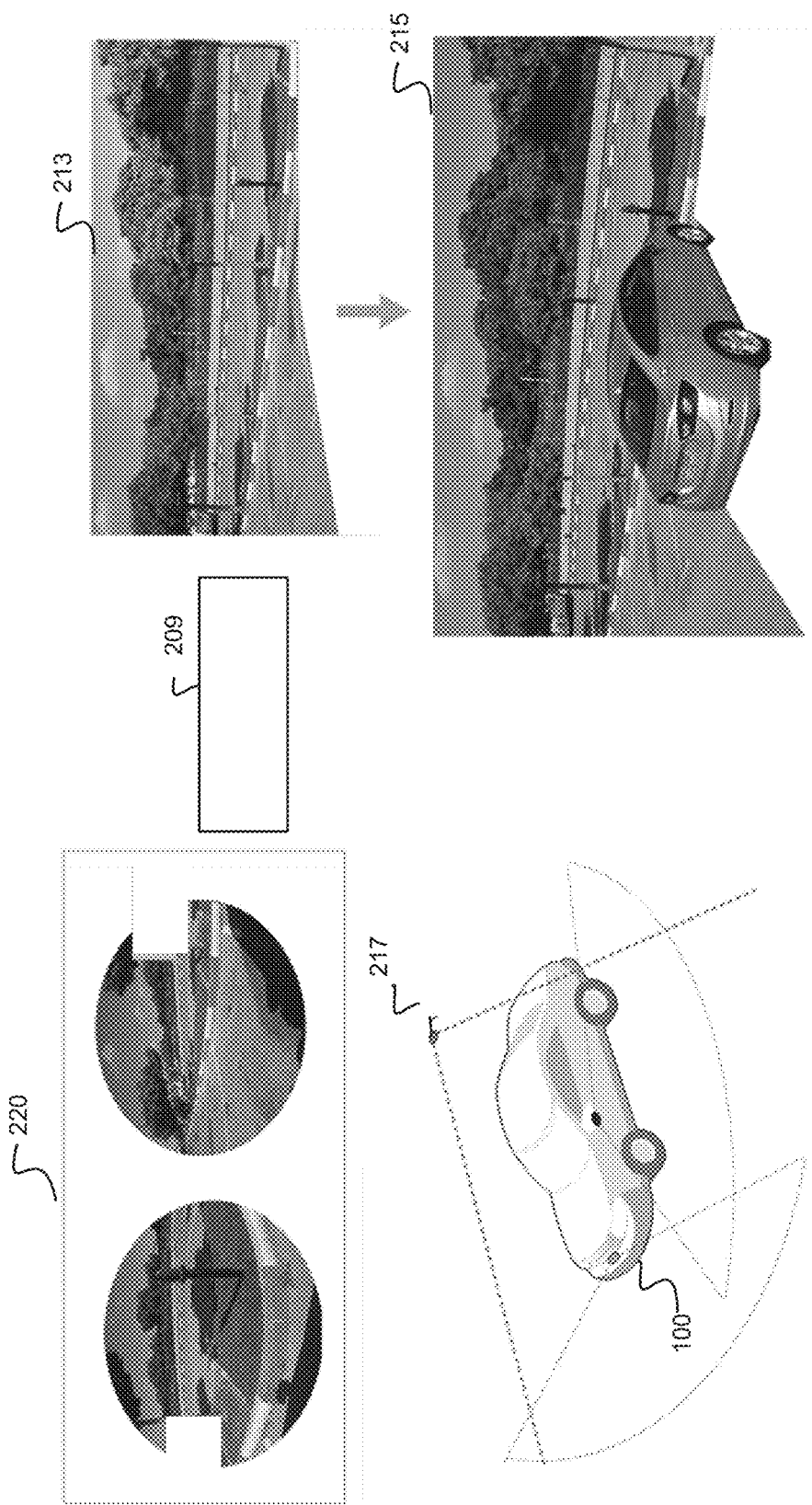
FIG. 3 is an illustration of images processed by the camera data processing system of FIG. 1, in accordance with various embodiments.
Figure 4:
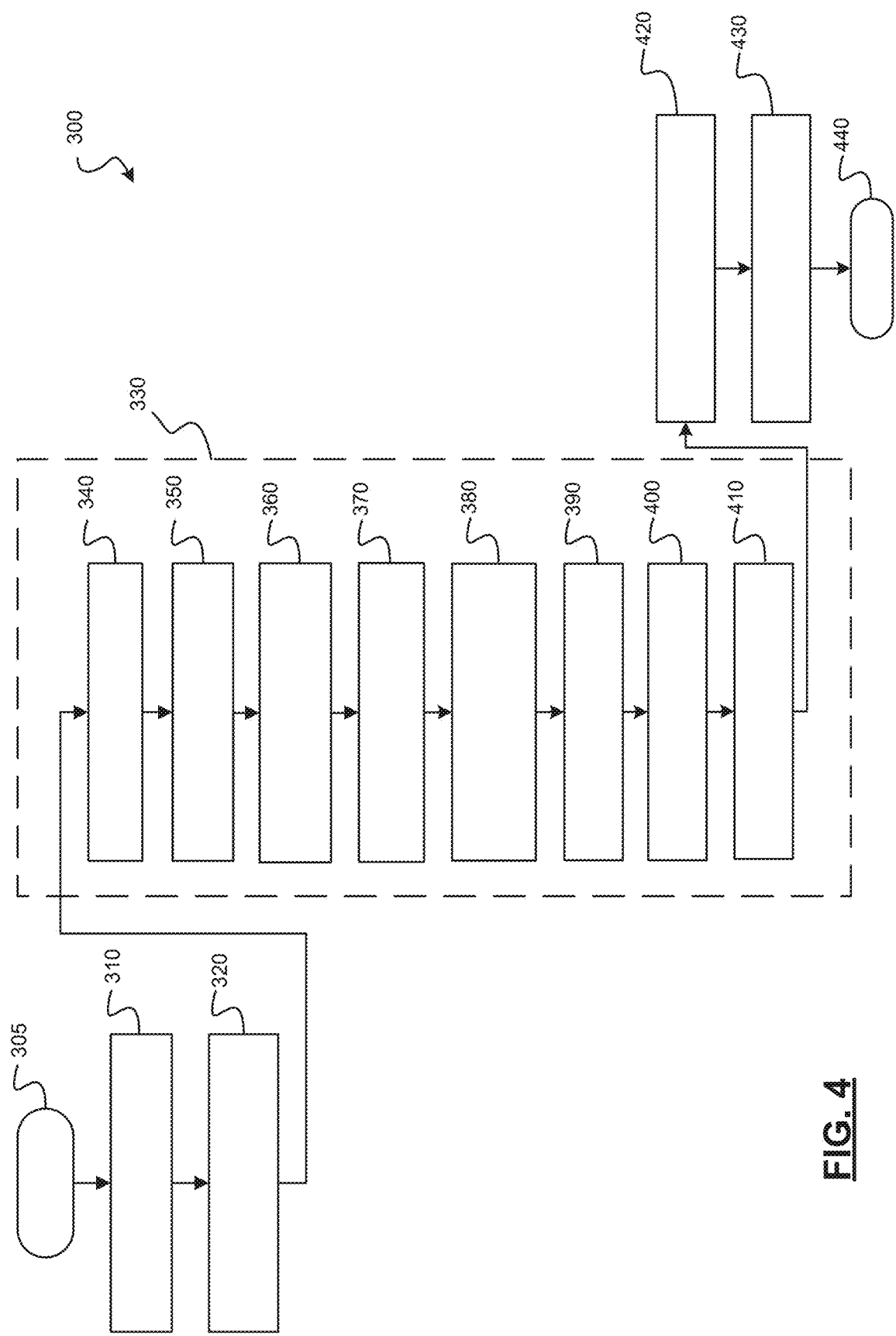
FIG. 4 is a flowchart illustrating a camera data processing method, in accordance with various embodiments.

In various embodiments, the data processing module 202 processes the camera data 220 with the trained machine learning model 209 based on camera parameters 222 associated with the camera data 220 (e.g., calibrations and alignments of a camera associated with the camera image 220), and desired viewpoint parameters 224 (e.g., calibrations and alignments of a camera at a desired viewpoint). As illustrated in FIG. 3, the data processing module 204 processes the camera data 220 (e.g., from two or more cameras), and the parameters 222, 224, to produce natural views 213, 215 from the desired viewpoint 217 relative to the vehicle 100.

In various embodiments, the trained machine learning model 209 includes one or more deep neural networks (DNNs) or other artificial neural network implemented as a single machine learning model. For example, as shown in more detail with regard to FIG. 4, a flowchart illustrates a process 300 for processing the camera data 220, in accordance with exemplary embodiments. The process 300 can be implemented in connection with the vehicle 100, camera system 102 and data processing system 104 of FIGS. 1 and 2, in accordance with exemplary embodiments. As can be appreciated, the order of the method may vary, and/or one or more steps may be added or removed in various embodiments.

In one example, the process 300 may begin at 305. The camera data 220 and associated camera parameters data 222 are received from the camera system 102 at 310. The camera data is pre-processed at 320. For example, the image in the camera data 220 is rectified to remove any distortions, address orientation, etc. Thereafter, the rectified camera data is processed with the trained machine learning model at 330.

For example, at 340 depth values are determined from a single image using a single camera model at a first step of the trained machine learning model. For example, depth values are generated for each surround camera by a DNN trained using a supervised "Depth-from-Mono" approach. At 350, depth pairwise disparity maps are determined from disparities determined from overlapping sections of two camera images provided by, for example, adjacent camera pairs at a second step of the trained machine learning model. At 360, a globally consistent surround depth map is generated based on the depth values from the single cameras and the disparities between the adjacent camera pairs at a third step of the machine learning model.

Thereafter, the desired viewpoint parameter data is received at 370 and the depth map is projected onto the desired camera based on the desired viewpoint parameters at 380. Using the projected map, at 390, visibility and occlusion handling is performed on the surround depth map at a fourth step of the machine learning model. For example, areas determined to be not observable by the desired camera are identified and the pixel data associated with the occlusion is handled via one or more object replacement techniques.

Using the projected map, at 400, viewpoint disparities are determined between pixels of the desired viewpoint (i.e., the generated depth map) and pixels of the camera viewpoint (i.e., the projected depth) map at a fifth step of the machine learning model. Based on the viewpoint disparities, pixel interpolation is performed on the projected map and weights are estimated at a sixth step of the machine learning model.

Thereafter, output view rendering is performed based on the pixel interpolation and estimated weights and the handled pixels at 420. The output view is then provided to a control system of the vehicle 100 or rendered on a screen in the vehicle 100 for viewing and/or control of the vehicle 100 at 430. Thereafter, the process 300 may end at 440.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of processing camera data from a camera system associated with a vehicle, comprising:
   storing a plurality of photorealistic scenes of an environment;
   training, by a processor, a machine learning model to produce a surround view approximating a ground truth surround view using the plurality of photorealistic scenes as training data; and
   processing, by a processor, the camera data from the camera system associated with the vehicle based on the trained machine learning model to produce a surround view of an environment of the vehicle,
   wherein the processing the camera data comprises:
   determining first depth values based on a single camera model for each camera of the camera system;
   determining pairwise disparity maps from overlapping sections of two adjacent camera images from the camera data; and
   determining a surround depth map based on the first depth values and the pairwise disparity maps.

2. The method of claim 1, wherein the training is based on deep learning methods.

3. The method of claim 2, wherein the machine learning model includes a deep neural network.

4. The method of claim 1, wherein the plurality of scenes is generated based on one or more style transfer methods.

5. The method of claim 1, wherein the plurality of scenes is generated based on physical models.

6. The method of claim 1, wherein the plurality of scenes is generated based on graphic design.

7. The method of claim 1, wherein the training comprises:
   projecting the scenes onto cameras using camera parameters to simulate an input view; and
   processing the input view with the machine learning model to generate a virtual surround view approximating one that would be obtained if acquired from a given vantage point by a camera with desired viewpoint parameters.

8. The method of claim 1, wherein the processing the camera data further comprises:
   determining viewpoint disparities between pixels on a desired viewpoint surround view and input camera pixels; and
   generating the surround view based on the viewpoint disparities.

9. The method of claim 1, wherein the processing the camera data further comprises:
   identifying occlusions based on the depth map;
   performing handling of the identified occlusions; and
   generating the surround view based on the handled occlusions.

10. A non-transitory computer readable medium for processing camera data from a camera system associated with a vehicle, comprising:

a data storage device configured to store a plurality of photorealistic scenes of an environment;

a training module configured to, by a processor, train a machine learning model to produce a surround view approximating a ground truth surround view using the plurality of photorealistic scenes as training data; and a data processing module configure to, by a processor, process the camera data from the camera system associated with the vehicle based on the trained machine learning model to produce a surround view of the environment of the vehicle, wherein data processing module processes the camera data by:

determining first depth values based on a single camera model for each camera of the camera system;

determining pairwise disparity maps from overlapping sections of two adjacent camera images from the camera data; and determining a surround depth map based on the first depth values and the pairwise disparity maps.

11. The non-transitory computer readable medium of claim 10, wherein the training module performs the training based on deep learning methods.

12. The non-transitory computer readable medium of claim 11, wherein the machine learning model includes a deep neural network.

13. The non-transitory computer readable medium of claim 10, wherein the plurality of scenes is generated based on one or more style transfer methods.

14. The non-transitory computer readable medium of claim 10, wherein the plurality of scenes is generated based on physical models.

15. The non-transitory computer readable medium of claim 10, wherein the plurality of scenes is generated based on graphic design.

16. The non-transitory computer readable medium of claim 10, wherein data processing module trains the machine learning model by:

projecting the scenes onto cameras using camera parameters to simulate an input view;

processing the input view with the machine learning model to generate a virtual surround view approximating one that would be obtained if acquired from a given vantage point by a camera with desired viewpoint parameters.

17. The non-transitory computer readable medium of claim 10, wherein data processing module processes the camera data by:

determining viewpoint disparities between pixels on a desired viewpoint surround view and input camera pixels; and generating the surround view based on the viewpoint disparities.

18. The non-transitory computer readable medium of claim 10, wherein data processing module processes the camera data by:

identifying occlusions based on the depth map;

performing handling of the identified occlusions; and generating the surround view based on the handled occlusions.

* * * * *